United States Patent
Ishii et al.

(10) Patent No.: US 12,005,401 B2
(45) Date of Patent: Jun. 11, 2024

(54) HYDROPHILIC POROUS MEMBRANE AND METHOD FOR PRODUCING HYDROPHILIC POROUS MEMBRANE

(71) Applicant: FUJIFILM Corporation, Tokyo (JP)

(72) Inventors: Akihiro Ishii, Minami-ashigara (JP); Takeshi Umehara, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 391 days.

(21) Appl. No.: 17/405,126

(22) Filed: Aug. 18, 2021

(65) Prior Publication Data

US 2021/0370238 A1    Dec. 2, 2021

Related U.S. Application Data

(63) Continuation of application No. PCT/JP2020/007282, filed on Feb. 25, 2020.

(30) Foreign Application Priority Data

Feb. 26, 2019   (JP) ................. 2019-032723

(51) Int. Cl.
  *B01D 69/02*   (2006.01)
  *B01D 67/00*   (2006.01)
  (Continued)

(52) U.S. Cl.
  CPC ......... *B01D 69/02* (2013.01); *B01D 67/0088* (2013.01); *B01D 71/22* (2013.01);
  (Continued)

(58) Field of Classification Search
  CPC ........ B01D 69/02; B01D 71/22; B01D 71/68; B01D 2325/34
  See application file for complete search history.

(56) References Cited

U.S. PATENT DOCUMENTS

| 4,794,002 A | 12/1988 | Henis et al. |
| 4,933,081 A | 6/1990 | Sasaki et al. |

(Continued)

FOREIGN PATENT DOCUMENTS

| CN | 86107568 A | 4/1987 |
| CN | 112261990 A | 1/2021 |

(Continued)

OTHER PUBLICATIONS

Extended European Search Report dated Mar. 22, 2022 in European Application No. 20762599.7.

(Continued)

*Primary Examiner* — Bradley R Spies
(74) *Attorney, Agent, or Firm* — Sughrue Mion, PLLC

(57) ABSTRACT

Provided are a hydrophilic porous membrane including a porous membrane and a hydroxyalkyl cellulose retained in the porous membrane, in which the average pore size differs between two surfaces of the porous membrane, the hydroxyalkyl cellulose distributed in the thickness direction of the hydrophilic porous membrane exhibits two or more peaks of detection intensity in GPC, and the weight-average molecular weight $Mw_{min}$ of the peak that is detected latest among the above-mentioned peaks is less than 100,000; and a method for producing a hydrophilic porous membrane, the method including separately preparing a hydrophilizing liquid including a hydroxyalkyl cellulose having a smaller weight-average molecular weight and a hydrophilizing liquid including a hydroxyalkyl cellulose having a larger weight-average molecular weight, and applying each of the hydrophilizing liquids on two surfaces of the porous membrane or sequentially on one surface thereof.

12 Claims, 1 Drawing Sheet

(51) Int. Cl.
B01D 71/22 (2006.01)
B01D 71/68 (2006.01)

(52) U.S. Cl.
CPC .......... *B01D 71/68* (2013.01); *B01D 2323/02* (2013.01); *B01D 2325/023* (2013.01); *B01D 2325/34* (2013.01); *B01D 2325/36* (2013.01)

(56) References Cited

U.S. PATENT DOCUMENTS

| | | |
|---|---|---|
| 5,019,261 A | 5/1991 | Stengaard |
| 6,045,694 A | 4/2000 | Wang et al. |
| 2007/0017914 A1 | 1/2007 | Shigesada et al. |
| 2007/0084788 A1 | 4/2007 | Moya et al. |
| 2015/0328591 A1 | 11/2015 | Morita et al. |
| 2021/0086139 A1 | 3/2021 | Ishii et al. |

FOREIGN PATENT DOCUMENTS

| | | |
|---|---|---|
| JP | 63-68646 A | 3/1988 |
| JP | 63-141610 A | 6/1988 |
| JP | 64-34403 A | 2/1989 |
| JP | 4-68966 B2 | 11/1992 |
| JP | 4-349927 A | 12/1992 |
| JP | 4-351645 A | 12/1992 |
| JP | 9-75694 A | 3/1997 |
| JP | 9-227714 A | 9/1997 |
| JP | 2000-515062 A | 11/2000 |
| JP | 2003-251152 A | 9/2003 |
| JP | 2006-116383 A | 5/2006 |
| JP | 2007-136449 A | 6/2007 |
| JP | 2010-235808 A | 10/2010 |
| JP | 2012-045524 A | 3/2012 |
| JP | 2015-157278 A | 9/2015 |
| WO | 2005/032684 A2 | 4/2005 |
| WO | 2005/037413 A1 | 4/2005 |
| WO | 2014/115438 A1 | 7/2014 |

OTHER PUBLICATIONS

Office Action dated Feb. 11, 2023 from the China National Intellectual Property Administration in CN Application No. 202080016305.5.
Office Action dated Dec. 15, 2023 in European Application No. 20 762 599.7.
International Preliminary Report on Patentability dated Aug. 25, 2021 in International Application No. PCT/JP2020/007282.
Written Opinion of the International Searching Authority dated Apr. 14, 2020 in International Application No. PCT/JP2020/007282.
International Search Report dated Apr. 14, 2020 in International Application No. PCT/JP2020/007282.

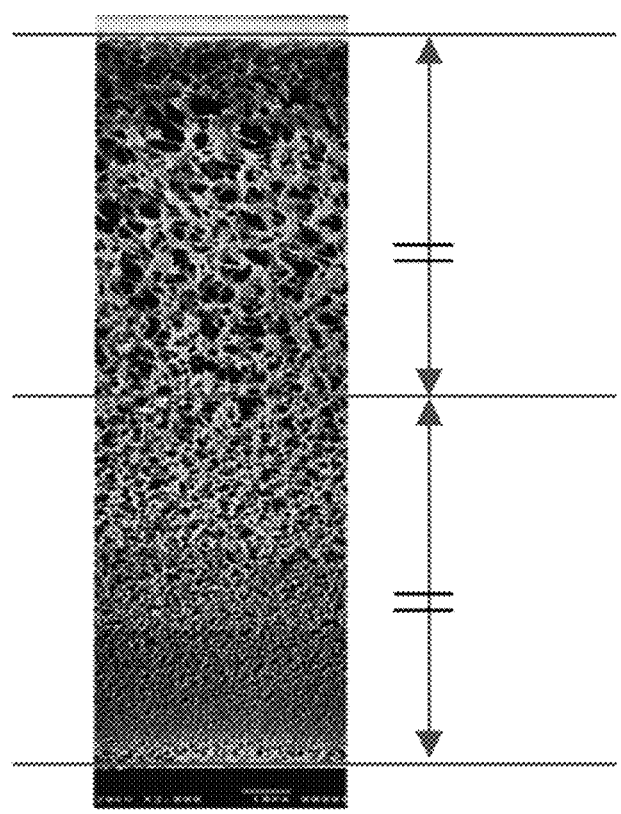

HYDROPHILIC POROUS MEMBRANE AND METHOD FOR PRODUCING HYDROPHILIC POROUS MEMBRANE

CROSS-REFERENCE TO RELATED APPLICATIONS

This application is a continuation of PCT International Application No. PCT/JP2020/007282 filed on Feb. 25, 2020, which claims priority under 35 U.S.C. § 119 (a) to Japanese Patent Application No. 2019-032723 filed on Feb. 26, 2019, the entire content of which is incorporated herein by reference.

BACKGROUND OF THE INVENTION

1. Field of the Invention

The present invention relates to a hydrophilic porous membrane and a method for producing a hydrophilic porous membrane.

2. Description of the Related Art

Porous membranes made of polymers are industrially useful as filtration membranes for water purification applications and the like, and products produced by pleating a porous membrane and storing the resultant in a cartridge having a certain capacity are also commercially available. Usually, filter cartridges are subjected to an integrity test in order to check the presence or absence of defects such as pinholes and defective sealing. In the integrity test, water is passed through a filtration membrane installed in a filter to fill the nanopores with water, subsequently air pressure is applied thereto, and gas leakage is observed. At this time, in a case where the filtration membrane is not wetted with water and there are nanopores that are not filled up with water, when pressure is applied, gas leaks even if there is no defect, and the presence or absence of defects (integrity) cannot be determined. That is, in a case where the filtration membrane is hydrophobic, it is difficult to accurately check the presence or absence of defects by the integrity test. Therefore, conventionally, hydrophilization of porous membranes using hydrophilic polymers has been conducted.

Furthermore, JP2003-251152A discloses a microfiltration porous membrane which is obtained by adding a hydrophilic polymer to a polyether sulfone membrane and withstands autoclave sterilization treatment. In the production of the microfiltration porous membrane described in JP2003-251152A, a hydroxypropyl cellulose having a molecular weight of 110,000 to 150,000 is used as a hydrophilic polymer.

In JP2006-116383A, a pleating treatment method for a filter obtained by hydrophilizing a polyethersulfone membrane, which is an anisotropic porous membrane, with hydroxypropyl cellulose, is described.

SUMMARY OF THE INVENTION

In an anisotropic porous membrane having a pore size distribution, a region having a small pore size is likely to be insufficiently hydrophilized or is prone to clogging, and the hydrophilization methods described in JP2003-251152A and JP2006-116383A still have room for improvement.

An object of the present invention is to provide a hydrophilic porous membrane and a method for producing the same. In particular, an object of the invention is to provide a hydrophilic porous membrane which can pass an integrity test at the time of being used as a filtration membrane of a filter cartridge, the hydrophilic porous membrane having high water permeability, and to provide a method for producing the hydrophilic porous membrane.

The inventors of the present invention have conducted thorough investigations in order to solve the above-described problems, and found that a hydrophilic porous membrane produced using a hydroxyalkyl cellulose having a weight-average molecular weight of less than 100,000 and a hydroxyalkyl cellulose having a higher weight-average molecular weight in combination gives accurate results in an integrity test due to sufficient hydrophilicity and also has high water permeability. Thus, the above-described problems have been solved.

That is, the present invention provides the following <1> to <12>.

<1> A hydrophilic porous membrane comprising:
a porous membrane; and
a hydroxyalkyl cellulose retained in the porous membrane,
in which an average pore size differs between two surfaces of the porous membrane,
the hydroxyalkyl cellulose distributed in a thickness direction of the hydrophilic porous membrane exhibits two or more peaks of detection intensity in gel permeation chromatography, and
a weight-average molecular weight $Mw_{min}$ of a peak that is detected latest among the peaks is less than 100,000.

<2> The hydrophilic porous membrane according to <1>,
in which in a case where the hydrophilic porous membrane is divided in the thickness direction into two parts having an equal thickness, namely, part A and part B, from a side of a surface with a smaller average pore size,
the detection intensity of the peak that is detected latest in the gel permeation chromatography of the hydroxyalkyl cellulose retained in the part A is higher than that of the hydroxyalkyl cellulose retained in the part B.

<3> The hydrophilic porous membrane according to <2>,
in which the hydrophilic porous membrane has a layered dense region with a minimum pore size in an inner part,
a pore size continuously increases in the thickness direction from the dense region toward at least one membrane surface of the porous membrane, and
the dense region is located in the part A.

<4> The hydrophilic porous membrane according to <3>, in which an average pore size of the dense region is 0.01 to 5 μm.

<5> The hydrophilic porous membrane according to any one of <1> to <4>, in which a weight-average molecular weight $Mw_{max}$ of a peak that is detected earliest among the peaks satisfies the following relationship:

$$30{,}000 \leq Mw_{max}/d_{max} \leq 130{,}000$$

in the formula, $d_{max}$ represents an average pore size [μm] at a surface on a side where the average pore size of the porous membrane is larger.

<6> The hydrophilic porous membrane according to any one of <1> to <5>, in which the porous membrane contains polyethersulfone or polysulfone.

<7> The hydrophilic porous membrane according to any one of <1> to <6>, in which the hydroxyalkyl cellulose is hydroxypropyl cellulose.

<8> The hydrophilic porous membrane according to any one of <1> to <7>, in which a total mass of the hydroxyalkyl cellulose is 0.02% to 3% by mass with respect to a total mass of the porous membrane.

<9> A method for producing a hydrophilic porous membrane that includes a porous membrane and a hydroxyalkyl cellulose retained in the porous membrane, the method comprising:

preparing the porous membrane having different average pore sizes at two surfaces;

applying a hydrophilizing liquid including a portion of a larger weight-average molecular weight of the hydroxyalkyl cellulose on a side of a surface with a larger average pore size of the porous membrane; and applying a hydrophilizing liquid including a portion of a smaller weight-average molecular weight of the hydroxyalkyl cellulose on a side of a surface with a smaller average pore size of the porous membrane.

<10> A method for producing a hydrophilic porous membrane that includes a porous membrane and a hydroxyalkyl cellulose retained in the porous membrane, the method comprising:

preparing the porous membrane having different average pore sizes at two surfaces; and applying a hydrophilizing liquid including a portion of a smaller weight-average molecular weight of the hydroxyalkyl cellulose on a side of a surface with a larger average pore size of the porous membrane and subsequently applying a hydrophilizing liquid including a portion of a larger weight-average molecular weight of the hydroxyalkyl cellulose on the same surface side.

<11> The method for producing a hydrophilic porous membrane according to <9> or <10>, in which the smaller weight-average molecular weight is less than 100,000.

<12> The method for producing a hydrophilic porous membrane according to any one of <9> to <11>, in which a hydroxyalkyl cellulose concentration of each of the hydrophilizing liquids including the hydroxyalkyl cellulose is 0.005% to 0.5% by mass in all cases.

A hydrophilic porous membrane and a method for producing the same are provided by the present invention. The hydrophilic porous membrane according to embodiments of the invention enables defect inspection by an integrity test for a filter cartridge and also has high water permeability.

BRIEF DESCRIPTION OF THE DRAWINGS

FIG. 1 is a diagram showing a cross-sectional view (photograph) of a porous membrane used in the Examples of the present invention.

DESCRIPTION OF THE PREFERRED EMBODIMENTS

Hereinafter, the present invention will be described in detail.

In the present specification, the term "to" is used to mean that the numerical values described before and after the term are included as the lower limit value and the upper limit value.

<Hydrophilic Porous Membrane>

In the present specification, a hydrophilic porous membrane means a membrane in which a porous membrane serving as a base material has been hydrophilized. A hydrophilic porous membrane refers to a membrane in which hydrophilicity has been increased for a porous membrane that serves as a base material, by retaining a hydroxyalkyl cellulose therein, and it is not intended to mean that the porous membrane serving as a base material is completely hydrophobic.

The hydrophilic porous membrane is a membrane having a plurality of nanopores. The pores can be checked with, for example, a scanning electron microscope (SEM) image or a transmission electron microscope (TEM) image of a membrane cross-section.

The hydrophilic porous membrane according to the embodiments of the invention includes a porous membrane and a hydroxyalkyl cellulose retained in this porous membrane.

In a case where it is said that a material is retained in the porous membrane, it is meant that the material is bonded to the porous membrane to the extent that the material is not easily peeled off during storage or use of the hydrophilic porous membrane. The porous membrane and the hydroxyalkyl cellulose may be bonded to each other by, for example, hydrophobic interaction.

In a case where the porous membrane serving as a base material is hydrophilized by a hydroxyalkyl cellulose, the hydroxyalkyl cellulose is generally retained in a state of coating at least a portion of the outer surface of the porous membrane. According to the present specification, the outer surface of the porous membrane means the membrane surface of the porous membrane (front surface or back surface of the membrane) and the surface of the porous membrane that is in contact with the various nanopores inside the porous membrane (may be referred to as "surface of nanopores" in the present specification). In the hydrophilic porous membrane according to the embodiments of the invention, the membrane surface (both the front surface and the back surface of the membrane) of the porous membrane is coated in a membrane thickness direction. Furthermore, in the hydrophilic porous membrane according to the embodiments of the invention, the surface of more numerous nanopores is coated as compared with the related art technologies, and preferably, the surface of substantially all the nanopores is coated.

The hydrophilic porous membrane according to the embodiments of the invention may include a portion that is not hydrophilized, in the area direction. That is, the hydrophilic porous membrane according to the embodiments of the invention may retain the hydroxyalkyl cellulose on the entire surface or may retain the hydroxyalkyl cellulose only in a portion. By retaining the hydroxyalkyl cellulose on the entire surface, hydrophilization of the entire porous membrane can be preferably achieved. Furthermore, by achieving hydrophilization only in a portion where hydrophilicity is particularly needed, hydrophilization can be achieved to a necessary extent while highly utilizing the characteristics of the porous membrane as the base material.

As a preferable example in which the hydrophilic porous membrane according to the embodiments of the invention retains the hydroxyalkyl cellulose only in a portion in the area direction, a hydrophilic porous membrane retaining a hydroxyalkyl cellulose only at both ends of a long side of a porous membrane that is in the form of a long sheet may be mentioned. Regarding the long side end parts, for example, in the case of a porous membrane having a short side that measures 20 to 35 cm, the two long side end parts may be regions located within 4 cm, and more preferably within 2 cm, in the short side direction from the edge of the long side of the hydrophilic porous membrane. In a case where the porous membrane is used as a filtration membrane of a filter cartridge, a load is likely to be applied at the both ends. That is, the porous membrane in the form of a long sheet is pleated as necessary and is rolled into a cylindrical shape, the seam is sealed, and then the both ends of the cylinder are fusion-welded to plates called end plates of the cartridge. At the time of fusion-welding, the porous membrane is hydrophobized as heat is applied thereto, and gas leakage caused by defective wetting is likely to occur during the integrity test. Particularly, as the hydrophilicity of the both ends to which heat is applied is increased by retaining a hydroxyalkyl cellulose, a hydrophilic porous membrane that can prevent a decrease in the hydrophilicity caused by a cartridge production process is obtained, and by utilizing this hydrophilic porous membrane, a filter cartridge that can pass an integrity test can be produced.

Therefore, it is preferable that the porous membrane in the form of a long sheet, particularly the porous membrane in the form of a long sheet used as a filtration membrane of a filter cartridge, retains a hydroxyalkyl cellulose at least at the two long side end parts.

[Porous Membrane]

(Structure of Porous Membrane)

According to the present specification, the porous membrane is a membrane that serves as a base material of the hydrophilic porous membrane.

A porous membrane refers to a membrane having a plurality of nanopores. The nanopores can be checked with, for example, a scanning electron microscope (SEM) image or a transmission electron microscope (TEM) image of a membrane cross-section.

In the porous membrane of the hydrophilic porous membrane according to the embodiments of the invention, the average pore size differs between the two surfaces (front surface and back surface) of the porous membrane. Comparison of the average pore sizes of the two surfaces is achieved by comparing the average pore sizes of the sections nearest to the front surface and the back surface of the membrane in the comparison of the pore sizes in the thickness direction of the membrane, which will be described later.

The porous membrane in the hydrophilic porous membrane according to the embodiments of the invention has a structure having a pore size distribution in the thickness direction. Furthermore, the structure is a structure asymmetric in the thickness direction, which has a pore size distribution such that the pore size at the front surface and the pore size at the back surface of the membrane differ from each other (asymmetric structure). Examples of the asymmetric structure include a structure in which the pore size continuously increases in the thickness direction from one membrane surface toward the other membrane surface, and a structure which has a layered dense region having the minimum pore size in the inner part that is inclined toward either surface, and in which the pore size continuously increases in the thickness direction from this dense region toward at least one membrane surface of the porous membrane.

It is preferable that the porous membrane used in the present invention has a structure in which the average pore size differs between the two surfaces of the porous membrane, and which has a layered dense region having the minimum pore size in the inner part. It is desirable that in a case where the porous membrane is divided into two parts having an equal thickness, namely, part A and part B, in the thickness direction, the dense region is located in the part A on the side of a surface having a smaller average pore size.

The term inner part of the porous membrane means that the part is not in contact with the surface of the membrane, and the phrase "has a dense region in the inner part" implies that in a case where the pore sizes in the thickness direction of the membrane are compared as will be described later, the dense region is not a section that is closest to either surface of the membrane. Depending on the case of using a porous membrane having a structure having a dense region in the inner part, the permeability of a substance intended to permeate therethrough is not likely to be lowered as compared to the case of using a porous membrane which has the same dense region to be in contact with the surface. While it is not wished to be bound by any theory, it is speculated to be because, as the dense region is in the inner part, adsorption of other substances such as proteins is not likely to occur.

According to the present specification, the average pore size of the porous membrane may be measured from a photograph of a membrane cross section obtained by an electron microscope. Specifically, an image of a cross section of the porous membrane can be obtained by cutting out slices for cross-section observation from the porous membrane that has been impregnated with methanol and then frozen in liquid nitrogen, using a microtome (EM UC6 manufactured by Leica Camera AG), and performing SEM imaging at 3000 times (manufactured by Hitachi High-Technologies Corporation, SU8030 type FE-SEM).

The average pore size of the hydrophilic porous membrane may be smaller than the pore size of the porous membrane as the base material by retaining the hydroxyalkyl cellulose, however, usually, the average pore size of the hydrophilic porous membrane can be approximated to be the same as the pore size of the porous membrane.

According to the present specification, in a case where a comparison of the pore sizes in the membrane thickness direction is made, the comparison is carried out by dividing a SEM image of a membrane cross-section in the membrane thickness direction. The number of divisions can be selected as appropriate according to the thickness of the membrane. The number of divisions is set to at least 5 or more, and for example, for a membrane having a thickness of 200 μm, a comparison is carried out by making twenty divisions starting from the surface having a smaller average pore size. In this case, nineteen dividing lines dividing each SEM image of the cross-section of the porous membrane into twenty divisions in the thickness direction are drawn, the pores that intersect or come into contact with each dividing line (closed pores) are traced with a digitizer, the diameters of equivalent circles having the same areas as the closed pores are obtained, and the average pore size of fifty continuous pores is determined. Meanwhile, the size of the division width means the size of the width in the thickness direction of the membrane and does not mean the width size in the image. In the comparison of the pore sizes in the thickness direction of the membrane, the pore sizes are compared as the average pore sizes of various sections. The average pore size of each section may be, for example, an average value of fifty pores in each section of a membrane cross-sectional view. The membrane cross-sectional view in this case may be obtained, for example, at a width of 80 μm (distance of 80 μm in a direction parallel to the surface). At this time, for a section in which the pores are large and fifty pores cannot be measured, it is acceptable to measure only the number of pores that can be taken in that section. Furthermore, at this time, in a case where a pore is so large that it does not fit in the section, the size of the pore is measured over other sections.

The layered dense region having the minimum pore size refers to a layered region of the porous membrane corresponding to a section having the minimum average pore size among the above-mentioned sections of the membrane cross-section. The dense region is composed of a region corresponding to one or a plurality of sections having an average pore size within 1.1 times that of the division having the minimum average pore size. The thickness of the dense region may be 0.5 µm to 50 µm, and it is preferable that the thickness is 0.5 µm to 30 µm. According to the present specification, the average pore size of the dense region is preferably 0.01 to 5 µm, more preferably 0.02 to 3 µm, and even more preferably 0.05 to 1.4 µm.

The average pore size of the dense region corresponds to the minimum pore size of the porous membrane. The minimum pore size of the porous membrane can also be measured according to ASTM F316-86.

The minimum pore size of the porous membrane can be appropriately selected according to the size of the object to be filtered.

In the porous membrane of the hydrophilic porous membrane of the present invention, in a case where the porous membrane is divided into two parts having an equal thickness in the thickness direction, the dense region is in part A on the side of a surface having a smaller average pore size (in the present specification, may be referred to as "surface X"). That is, the dense region is inclined toward the surface X side from the central region in the thickness of the porous membrane. Specifically, it is preferable that the dense region is located within a distance of ⅖, more preferably within a distance of ⅓, and even more preferably within a distance of ¼, of the thickness of the porous membrane from the surface X. This distance may be determined in the above-mentioned membrane cross-section image.

In the porous membrane, the pore size may continuously increase in the thickness direction from the dense region toward at least any one surface. In the porous membrane, the pore size may continuously increase in the thickness direction from the dense region toward the surface X, the pore size may continuously increase in the thickness direction from the dense region toward the surface on the opposite side of the surface X, or the pore size may continuously increase from the dense region toward both surfaces of the porous membrane in the thickness direction. Among these, it is preferable that the pore size continuously increases in the thickness direction at least from the dense region toward the surface on the opposite side of the surface X, and it is more preferable that the pore size continuously increases from the dense region toward both surfaces of the porous membrane in the thickness direction. The phrase "pore size continuously increases in the thickness direction" implies that the pore size increases such that the difference in the average pore size between adjoining sections in the thickness direction is 50% or less, preferably 40% or less, and more preferably 30% or less, of the difference between the maximum average pore size (maximum pore size) and the minimum average pore size (minimum pore size). The term "continuous increases" essentially means that there is no decrease and that an increase occurs uniformly, however, a region where there is a decrease may occur accidentally. For example, on the occasion of combining two sections into each group from the surface, in a case where the average value of the combination is uniformly increasing (uniformly decreasing in the case of going from the surface toward the dense region), it can be considered that the "pore size continuously increases in the thickness direction from the dense region toward the surface of the membrane".

The maximum pore size of the porous membrane is preferably 0.1 µm or more, more preferably more than 0.1 µm, and even more preferably more than 1.5 µm, and is preferably 25 µm or less, more preferably 23 µm or less, and even more preferably 21 µm or less. According to the present specification, the average pore size of the section having the largest average pore size among the above-mentioned sections of the membrane cross-section is designated as the maximum pore size of the porous membrane.

The ratio of the average pore size of the dense region and the maximum pore size of the porous membrane (ratio of the minimum pore size and the maximum pore size of the porous membrane, the ratio being a value obtained by dividing the maximum pore size by the minimum pore size; in the present specification, also referred to as "anisotropic ratio") is preferably 3 or more, more preferably 4 or more, and even more preferably 5 or more. This is because the average pore size of regions other than the dense region is increased, and the substance permeability of the porous membrane is increased. The anisotropic ratio is preferably 25 or less, and more preferably 20 or less. It is because an effect such as multi-stage filtration as described above is efficiently obtained with an anisotropic ratio in the range of 25 or less.

It is preferable that the section having the largest average pore size is a section that is closest to any surface of the membrane, or a section that is in contact with that section.

In the section closest to either surface of the membrane, the average pore size is preferably more than 0.05 µm and 25 µm or less, more preferably more than 0.08 µm and 23 µm or less, and even more preferably more than 0.1 µm and 21 µm or less. Furthermore, the ratio of the average pore size of the section closest to either surface of the membrane to the average pore size of the dense region is preferably from 1.2 to 20, more preferably from 1.5 to 15, and even more preferably from 2 to 13.

The thickness of the porous membrane is not particularly limited, however, from the viewpoints of the membrane strength, handleability, and filtration performance, the thickness is preferably 10 µm to 1,000 µm, more preferably 10 µm to 500 µm, and even more preferably 30 µm to 300 µm.

The thickness of the hydrophilic porous membrane may be larger than the thickness of the porous membrane as the base material, by retaining a hydroxyalkyl cellulose, however, the thickness of the hydrophilic porous membrane is usually almost the same as the thickness of the porous membrane.

(Composition of Porous Membrane)

The porous membrane includes a polymer. It is preferable that the porous membrane is essentially formed of a polymer. The polymer preferably has a number-average molecular weight (Mn) of 1,000 to 10,000,000, and more preferably 5,000 to 1,000,000.

Examples of the polymer include thermoplastic or thermosetting polymers. Specific examples of the polymer include polysulfone, sulfonated polysulfone, polyether sulfone (PES), sulfonated polyether sulfone, cellulose acylate, nitrocellulose, polyacrylonitrile, a styrene-acrylonitrile copolymer, a styrene-butadiene copolymer, a saponification product of an ethylene-vinyl acetate copolymer, polyvinyl alcohol, polycarbonate, an organosiloxane-polycarbonate copolymer, polyester carbonate, an organopolysiloxane, polyphenylene oxide, polyamide, polyimide, polyamideimide, polybenzimidazole, an ethylene-vinyl alcohol copolymer, polytetrafluoroethylene (PTFE), polyethylene, polypropylene, polyfluoroethylene, polyethylene terephthalate, 6,6-nylon, and polyvinylidene fluoride (PVDF). These may be homopolymers, copolymers, polymer blends, or polymer alloys, from the viewpoints of solubility, optical properties, electrical properties, strength, elasticity, and the like.

Among these, polysulfone, polyether sulfone, PVDF, sulfonated polysulfone, sulfonated polyether sulfone, 6,6-nylon, and cellulose acylate are preferred, and polysulfone is more preferred.

The porous membrane may include components other than the polymer, as additives.

Examples of the additives include metal salts of inorganic acids, such as sodium chloride, lithium chloride, sodium nitrate, potassium nitrate, sodium sulfate, and zinc chloride; metal salts of organic acids, such as sodium acetate and sodium formate; polymers such as polyethylene glycol and polyvinylpyrrolidone; polymer electrolytes such as sodium polystyrene sulfonate and polyvinyl benzyl trimethylammonium chloride; and ionic surfactants such as sodium dioctyl sulfosuccinate and sodium alkyl methyl taurate. The additives may act as swelling agents for the porous structure.

For example, in a case where polysulfone or polyether sulfone is used as the polymer, it is preferable that the porous membrane further includes polyvinylpyrrolidone. At this time, the polyvinylpyrrolidone may be in a state of being retained in the porous membrane. Polysulfone or polyether sulfone, both of which are hydrophobic, acquires increased hydrophilicity by including polyvinylpyrrolidone. Polyvinylpyrrolidone is, for example, added as a pore-forming agent to a stock solution for film-forming of a polysulfone membrane or a polyether sulfone membrane, as described in JP1989-34403A (JP-S64-34403A). Most of the polyvinylpyrrolidone in the stock solution for film-forming is dissolved in coagulating water and removed during the film-forming process, however, a portion thereof remains on the membrane surface.

It is preferable that the porous membrane is a membrane formed from one composition as a single layer, and it is preferable that the porous membrane is not a laminated structure of a plurality of layers.

With regard to the method for producing the porous membrane, reference can be made to JP1988-141610A (JP-S63-141610A), JP1992-349927A (JP-H4-349927A), JP1992-68966B (JP-H4-68966B), JP1992-351645A (JP-H4-351645A), JP2010-235808A, and the like.

A commercially available product may be used as the porous membrane. Examples include SUMILITE FS-1300 (manufactured by Sumitomo Bakelite Co., Ltd.), MICRO PES 1FPH (manufactured by Membrana GmbH), Astropore (polysulfone membrane, manufactured by FUJIFILM Corporation), Durapore (PVDF membrane, manufactured by Merk millipore, Ltd.), and Sartopore (PES membrane, manufactured by Sartorius AG).

[Hydroxyalkyl Cellulose]

The hydroxyalkyl cellulose in the hydrophilic porous membrane according to the embodiments of the invention is a hydrophilic polymer that makes the porous membrane hydrophilic.

Hydrophobicity of the cellulose skeleton of the hydroxyalkyl cellulose contributes to the hydrophobic interaction with the porous membrane, which is a base material, and retains the hydroxyalkyl cellulose in the porous membrane, and at the same time, hydrophilicity can be imparted to the porous membrane by means of a hydroxy group or a hydroxypropyl group in a side chain of the hydroxyalkyl cellulose. In addition, since the hydroxyalkyl cellulose has a high intermolecular force, it is presumed that the molecules can strongly interact with each other in the hydrophilic porous membrane and retain the form of the hydrophilic porous membrane.

Furthermore, since a hydroxyalkyl cellulose is a component that can be used as a food additive, it is not necessary to wash away the hydroxyalkyl cellulose after filter cartridge production. Therefore, a safe hydrophilic porous membrane with low process load can be obtained.

The hydroxyalkyl cellulose distributed in the thickness direction in the hydrophilic porous membrane according to the embodiments of the invention shows two or more peaks of detection intensity in gel permeation chromatography, and the weight-average molecular weight $Mw_{min}$ of the peak detected latest among the above-mentioned peaks is less than 100,000. Specifically, in a case where the hydrophilic porous membrane according to the embodiments of the invention is cut out so as to include the entire thickness direction of the hydrophilized region, and the hydroxyalkyl cellulose included therein is subjected to gel permeation chromatography, two or more peaks are detected as described above. Gel permeation chromatography (GPC) can be specifically measured according to the procedures and conditions described in the Examples of the present specification. Furthermore, the weight-average molecular weight of each peak detected by GPC can be determined by a method well known to those skilled in the art (see, for example, Sadao Mori, "Size Exclusion Chromatography", Kyoritsu Shuppan (1991)).

Regarding the above-described peaks observed by gel permeation chromatography, from the viewpoint of hydrophilization appropriate for the pore size, it is more preferable as there are more peaks, and it is more preferable that the peaks have a stepwise distribution of the weight-average molecular weight as it is less possible to discriminate the peaks as proper peaks by conventional measurement. However, from the viewpoint of easy availability of hydroxyalkyl celluloses, the number of the above-described peaks observed by gel permeation chromatography is preferably two or three, and more preferably two.

The hydrophilic porous membrane according to the embodiments of the invention includes a hydroxyalkyl cellulose showing a peak of a weight-average molecular weight of less than 100,000 in gel permeation chromatography, that is, a hydroxyalkyl cellulose weight-average molecular weight of less than 100,000. By including a hydroxyalkyl cellulose having a weight-average molecular weight of less than 100,000, the surface of nanopores in a region having a smaller pore size in the porous membrane can also be hydrophilized. Furthermore, the hydroxyalkyl cellulose is less likely to aggregate. Therefore, clogging caused by the hydroxyalkyl cellulose is less likely to occur, and deterioration of the water permeability of the hydrophilic porous membrane can be prevented.

The weight-average molecular weight $Mw_{min}$ of the hydroxyalkyl cellulose corresponding to the peak that is detected latest in gel permeation chromatography, that is, the weight-average molecular weight of the hydroxyalkyl cellulose having the lowest weight-average molecular weight among the hydroxyalkyl celluloses included in the hydrophilic porous membrane according to the embodiments of the invention is preferably 10,000 or more, more preferably from 10,000 to 80,000, and even more preferably from 30,000 to 50,000. Furthermore, by adjusting the weight-average molecular weight to 10,000 or more, the interaction between the hydroxyalkyl celluloses and the interaction between the hydroxyalkyl cellulose and the porous membrane can be made sufficient so that the hydroxyalkyl cellulose can be retained in the porous membrane.

In the hydroxyalkyl cellulose distributed in the thickness direction in the hydrophilic porous membrane according to the embodiments of the invention, a hydroxyalkyl cellulose having a weight-average molecular weight of 100,000 or more, which shows a peak different from the above-described peak that is detected latest in gel permeation chromatography, is also included. By including a hydroxyalkyl cellulose having a larger weight-average molecular weight, the surface of nanopores in a region having a larger pore size in the porous membrane can be efficiently hydrophilized. The weight-average molecular weight of the hydroxyalkyl cellulose having a weight-average molecular weight of 100,000 or more is more preferably from 100,000 to 2,500,000, and even more preferably from 140,000 to 1,500,000.

Furthermore, with regard to the weight-average molecular weight $Mw_{max}$ of the hydroxyalkyl cellulose having the largest weight-average molecular weight (weight-average molecular weight of the peak that is detected earliest among two or more peaks detected by GPC) among the hydroxyalkyl celluloses having a weight-average molecular weight of 100,000 or more, it is preferable that the relationship thereof with the average pore size $d_{max}$ [µm] of the surface on the side having a large pore size of the porous membrane satisfies the following relationship. As a result, the surface of nanopores having a larger pore size can be efficiently hydrophilized, and also, clogging can be prevented.

$$30{,}000 \leq Mw_{max}/d_{max} \leq 130{,}000$$

Furthermore, it is more preferable that the following relationship is satisfied.

$$80{,}000 \leq Mw_{max}/d_{max} \leq 110{,}000$$

The fact that the surface of nanopores in a region with a smaller pore size is hydrophilized by a hydroxyalkyl cellulose having a smaller weight-average molecular weight, and that the surface of nanopores in a region with a larger weight-average molecular weight is hydrophilized by a hydroxyalkyl cellulose having a larger weight-average molecular weight, can be discriminated and verified from the following analysis.

In a case where the porous membrane is divided into two parts having an equal thickness, namely, part A and part B, in the thickness direction from the side of a surface with a smaller average pore size, in the gel permeation chromatography of the hydroxyalkyl cellulose retained in the part A rather than the part B, the detection intensity of the peak having the slowest detection time among the above-described two or more peaks increases. For example, PSE20 used in the Examples of the present application has a structure as shown in the cross-sectional view in FIG. 1, however, in a case where the PSE20 is divided into two equal parts in the thickness direction, the lower side is part A in FIG. 1, while the upper side is part B. As can be seen from FIG. 1, the part A usually has a dense region. In such an example, the hydroxyalkyl cellulose eluted from the part A exhibits a weight-average molecular weight smaller than that of the hydroxyalkyl cellulose eluted from the part B.

Regarding the hydroxyalkyl cellulose, a hydroxyalkyl cellulose obtained by adding an alkylene oxide having from 3 to 5 carbon atoms to cellulose is preferred. This is because the interaction between the porous membrane and the hydroxyalkyl cellulose and the hydrophilicity of the resulting hydrophilic porous membrane are obtained to the extent that is preferable for practical use. Among these, hydroxypropyl cellulose obtained by adding propylene oxide (having 3 carbon atoms) to cellulose is most preferred. In a case where the number of addition (degree of substitution) of the alkylene oxide is large, hydrophilicity increases, and in a case where the number of addition is small, hydrophilicity decreases. From this point of view, the degree of molar substitution is preferably 1 or more, and more preferably 2 or more.

The content of the hydroxyalkyl cellulose is preferably 0.02% to 3% by mass, and more preferably 0.05% to 1.0% by mass, with respect to the mass of the hydrophilic porous membrane in the region where the hydroxyalkyl cellulose is retained (region where the hydroxyalkyl cellulose has been caused to permeate). The content of the hydroxyalkyl cellulose in the porous membrane can be measured by, for example, the method shown in the Examples.

[Method for Producing Hydrophilic Porous Membrane]

The hydrophilic porous membrane can be produced by subjecting the porous membrane, which is a base material, to a hydrophilization treatment using a hydroxyalkyl cellulose. Specifically, the hydrophilic porous membrane can be produced by causing a hydrophilizing liquid including a hydroxyalkyl cellulose to permeate the porous membrane. The hydrophilized porous membrane may be further subjected to a washing treatment, a sterilization treatment, and the like.

(Hydrophilizing Liquid)

The hydrophilizing liquid may be prepared as a solution including a hydroxyalkyl cellulose. The solvent is not particularly limited as long as it is water or a solvent having a property of being miscible with water. The solvent may be a mixed solvent of water and an organic solvent. In a case where a mixed solvent of water and an organic solvent is used, the organic solvent is preferably at least one or more lower alcohols. Examples of the lower alcohols include alcohols having 5 or fewer carbon atoms, such as methanol, ethanol, propanol, isopropanol, butanol, ethylene glycol, propylene glycol, and glycerin. As the organic solvent, methanol, ethanol, or isopropanol is more preferred, and ethanol is even more preferred. It is particularly preferable that the solvent of the hydrophilizing liquid is water.

The hydrophilizing liquid may also include a surfactant, a preservative, a film curing agent such as polyphenol, and the like in addition to the hydroxyalkyl cellulose and the solvent.

(Permeation)

The method of causing the hydrophilizing liquid to permeate the porous membrane is not particularly limited, and examples thereof include an immersion method, a coating method, a transfer method, and a spraying method. It is preferable that the permeation is carried out such that the hydrophilizing liquid permeates the entire thickness direction of the porous membrane at least in the region that is subjected to hydrophilization. Among these, the immersion method or the coating method is preferred. This is because the hydrophilizing liquid can be caused to efficiently permeate the inner part of the porous membrane. A coating method is more preferable as a method of causing the hydrophilizing liquid to permeate the porous membrane. This is because a hydroxyalkyl cellulose adequate for the pore size can be caused to efficiently permeate even to the inner part of the porous membrane.

As the coating method, a method carried out by applying a hydrophilizing liquid including a hydroxyalkyl cellulose having the above-described weight-average molecular weight distribution on one side or both sides of the porous membrane, and a method carried out by separately preparing a hydrophilizing liquid for each of hydroxyalkyl celluloses having different weight-average molecular weights and separately applying the hydrophilizing liquids, may be mentioned. Particularly, a hydroxyalkyl cellulose adequate for the pore size can be caused to permeate the porous membrane by the latter method of preparing a hydrophilizing liquid for each of the different weight-average molecular weights.

As the hydrophilizing liquids prepared for the different weight-average molecular weights are applied on the porous membrane, for example, as shown in the following procedure 1 or 2, aggregation of the hydroxyalkyl cellulose can be prevented, and clogging of the porous membrane by the hydroxyalkyl cellulose can be prevented.

Procedure 1 (Double-Sided Application)

A hydrophilizing liquid including a hydroxyalkyl cellulose having a larger weight-average molecular weight is applied on the side of a surface with a larger average pore size of the porous membrane, and a hydrophilizing liquid including a hydroxyalkyl cellulose having a smaller weight-average molecular weight is applied on the side of a surface with a smaller average pore size.

Procedure 2 (Sequential Application)

A hydroxyalkyl cellulose solution having a smaller weight-average molecular weight is applied on the side of a surface with a larger average pore size of the porous membrane, and then a hydroxyalkyl cellulose solution having a larger weight-average molecular weight is applied on the same surface side.

It is preferable that the application is performed such that the hydrophilizing liquid permeates the entire thickness direction of the porous membrane. In a case where the application is performed using a plurality of hydrophilic liquids, it is desirable that the hydrophilizing liquids permeate the entire thickness direction of the porous membrane after all the hydrophilizing liquids have been applied. In a case where only a portion of the porous membrane is coated, a coating method of applying the hydrophilizing liquids only on the portion that is wished to be coated can be carried out. The application of a hydrophilizing liquid can be carried out by a method of bringing a sponge or cloth impregnated with the hydrophilizing liquid into contact with the surface of the porous membrane, or a known method such as bead coating, gravure coating, or wire bar coating.

In the immersion method, the porous membrane is impregnated with a hydrophilizing liquid by immersing the porous membrane in the hydrophilizing liquid. As the hydrophilizing liquid, a hydrophilizing liquid including a hydroxyalkyl cellulose having the above-described weight-average molecular weight distribution may be used. After the immersion, any excess hydrophilizing liquid may be removed by pulling up the porous membrane from the hydrophilizing liquid.

The immersion may be carried out under pressure. By applying pressure, a hydrophilizing liquid can be efficiently injected into various nanopores of the porous membrane.

The immersion time or the press-fitting time in the case of carrying out an immersion treatment or a press-fitting treatment is not particularly limited, however, generally, the immersion time or the press-fitting time may be about 0.5 seconds to 1 minute and is preferably about 0.5 seconds to 30 seconds. Shortening of the immersion time can be promoted by selection of a solvent or the like.

The amount of attachment of the hydroxyalkyl cellulose can be appropriately regulated by means of the immersion time for the porous membrane in the hydrophilizing liquid and the hydroxyalkyl cellulose concentration in the hydrophilizing liquid.

(Drying and Heating)

After permeation of the hydrophilizing liquid into the porous membrane, it is preferable to volatilize and remove the solvent in the hydrophilizing liquid by drying. Examples of the drying means include heat drying, air drying, and reduced pressure drying, and there is no particular limitation, however, air drying or heat drying is preferred from the viewpoint of simplicity of the production process. Drying may be achieved by simply leaving the porous membrane to stand.

(Washing)

After the above-described drying, it is preferable to perform washing using a washing solvent. This is because any excess hydroxyalkyl cellulose and the like can be removed. Furthermore, unnecessary components included in the raw material porous membrane can also be removed by washing. The washing method is not particularly limited, however, a washing solvent may be caused to permeate the membrane surface and the nanopore surface of the hydrophilic porous membrane by an immersion or press-fitting method and then removed. Examples of the washing solvent can include the solvents mentioned as examples of the solvent of the hydrophilizing liquid. Permeation and removal of the washing solvent may be performed two or more times. At this time, the washing solvents used in the washing of two or more times may be the same or may be different, however, it is preferable that the washing solvents are different. The washing solvent used at the end of washing is preferably water. It is particularly preferable that the porous membrane is immersed in water. This is because organic solvent components such as alcohol are eliminated.

The hydrophilic porous membrane after washing may be dried again by the above-described procedure.

(Sterilization Treatment)

As a sterilization treatment for the hydrophilic porous membrane, for example, a high-pressure steam sterilization treatment can be carried out. Particularly, it is preferable to perform a treatment by means of steam at high temperature and high pressure using an autoclave. Usually, a high-pressure steam sterilization treatment for plastics is carried out by pressurizing with saturated steam and treating for 10 to 30 minutes in an environment at about 110° C. to 140° C., however, the sterilization treatment of the hydrophilic porous membrane according to the embodiments of the invention can also be carried out under similar conditions. Examples of the autoclave used for the sterilization treatment include SS325 manufactured by Tomy Seiko Co., Ltd.

<Use Application of Hydrophilic Porous Membrane>

The hydrophilic porous membrane according to the embodiments of the invention can be used in various use applications as a filtration membrane. The filtration membrane is applied to separation, purification, collection, concentration, and the like of liquids containing or suspending various polymers, microorganisms, yeasts, and fine particles, and can be applied particularly to a case where from a liquid containing minute fine particles that need to be filtered, those fine particles need to be separated. For example, a filtration membrane can be used in the case of separating fine particles from various suspensions, fermentation liquids, culture liquids, and the like, all of which contain fine particles, as well as suspensions of pigments. Specifically, the hydrophilic porous membrane according to the embodiments of the invention can be used as a microfiltration membrane that is required for the production of drugs in the pharmaceutical industry, the production of alcoholic beverages such as beer in the food industry, refined processing in the electronic industrial field, the production of purified water, and the like.

In a case where the hydrophilic porous membrane according to the embodiments of the invention having a pore size distribution is used as a filtration membrane, fine particles can be efficiently captured by disposing a region with a smaller pore size to come closer to the exit side (outlet side) of the filtrate and performing filtration. Furthermore, since the hydrophilic porous membrane has a pore size distribution, the fine particles that have been introduced through the surface of the membrane are eliminated by adsorption or adhesion before reaching the minimum pore size portion. Therefore, clogging is not likely to occur, and high filtration efficiency can be maintained over a long period of time.

The hydrophilic porous membrane according to the embodiments of the invention can be used for various applications after being processed into a shape according to the use application. Examples of the shape of the hydrophilic porous membrane include a flat membrane shape, a tubular shape, a hollow fiber shape, a pleated shape, a fibrous shape, a spherical particle shape, a crushed particle shape, and a lump-shaped continuous body shape. The hydrophilic porous membrane may be processed into a shape according to the use application before the hydrophilization treatment of the porous membrane, or may be processed into a shape according to the use application after the hydrophilization treatment of the porous membrane.

The hydrophilic porous membrane may be mounted in a cartridge is easily removable in devices that are used for various use applications. It is preferable that the hydrophilic porous membrane is retained in a form capable of functioning as a filtration membrane in the cartridge. A cartridge retaining the hydrophilic porous membrane can be produced in the same manner as in the case of a known porous membrane cartridge, and for example, reference can be made to WO 2005/037413A and JP2012-045524A.

For example, the filter cartridge can be produced as follows.

A long hydrophilic porous membrane is pleated such that creases are formed in the short side (width) direction. For example, the long hydrophilic porous membrane can be usually sandwiched between two sheets of membrane supports, and the assembly can be pleated by a known method. A nonwoven fabric, a woven fabric, a net, or the like may be used as the membrane support. The membrane support functions so as to reinforce the filtration membrane against fluctuations in the filtration pressure and also to introduce a liquid into the inner parts of the folds. The width of the pleat folds may be, for example, 5 mm to 25 mm. The pleated hydrophilic porous membrane may be rolled into a cylindrical shape, and the seam thereof may be sealed.

The cylindrical-shaped hydrophilic porous membrane is end-sealed to end plates. End-sealing may be performed by a known method according to the material of the end plates. At the time of using a thermosetting epoxy resin for the end plates, a liquid of a prepared epoxy resin adhesive is poured into a potting mold and preliminarily cured to increase the viscosity of the adhesive to an appropriate degree, one end surface of a cylindrical-shaped filter material is inserted into this epoxy adhesive, and then the epoxy adhesive may be completely cured by heating. In a case where the material of the end plates is a thermoplastic resin such as polypropylene or polyester, a method of pouring a heat-melted resin into a mold and then immediately inserting one end surface of the cylindrical-shaped filter material into the resin, may be carried out. On the other hand, only the sealing surface of an already molded end plate is brought into contact with a hot plate or is irradiated with an infrared heater to melt only the plate surface, and one end surface of the cylindrical filter material may be pressed against the molten surface of the plate to be welded thereto.

The assembled filter cartridge may be further subjected to a known washing process.

In the filter cartridge, part or all of the hydroxyalkyl cellulose in the hydrophilic porous membrane may be dissolved in a solvent that is used in a washing process or the like and removed.

EXAMPLES

Features of the embodiments of the present invention will be described more specifically below by way of Examples and Comparative Examples. The materials, amounts of use, proportions, treatment contents, treatment procedures, and the like shown in the following Examples can be appropriately modified without departing from the purport of the present invention. Therefore, the scope of the present invention should not be limitedly interpreted by the following specific examples.

[Preparation of Hydrophilizing Liquid]

Regarding hydroxypropyl cellulose, NISSO HPC H grade (molecular weight 1,000,000), M grade (molecular weight 700,000), SL grade (molecular weight 100,000) and SSL grade (molecular weight 40,000), all manufactured by Nippon Soda Co., Ltd., were used. Regarding hydroxyethyl cellulose, SANHEC M grade (molecular weight 720,000) and L grade (molecular weight 90,000) manufactured by Sansho Co., Ltd. were used. Any one of the above-described compounds was added to pure water to reach the mass % concentration shown in Table 1, and the mixture was stirred until completely dissolved. Furthermore, in Table 1, for Example 1 and Comparative Example 1, any two grades of the above-described compounds were mixed and used, however, the two grades were mixed at a mass ratio of 1:1, and the concentrations described in the table are the concentrations of the mixtures.

[Production of Hydrophilic Porous Membrane]

Hydrophilic porous membranes of various Examples and Comparative Examples were produced by the procedure described in Table 1, using the porous membranes described in Table 1.

In Table 1, PSF is a polysulfone membrane PSE20 manufactured by FUJIFILM Corporation. PSE20 has a minimum pore size of 0.2 μm, a maximum pore size (average pore size of a surface with a larger average pore size: $d_{max}$) of 7 μm, and a thickness of 140 μm, and has a structure having an asymmetric pore size distribution. A cross-sectional view is shown in FIG. 1. PSF2 was formed into a membrane by referring to Example 1 of JP1997-227714A (JP-H9-227714A). PSF2 has a minimum pore size of 2 μm, a maximum pore size (average pore size of a surface with a larger average pore size: $d_{max}$) of 20 μm, and a thickness of 180 μm, and has a structure having an asymmetric pore size distribution. PES is a polyether sulfone membrane, MEMBRANA TM200, manufactured by 3M, which has a minimum pore size of 0.3 μm, a maximum pore size (average pore size of a surface with a larger average pore size: $d_{max}$) of 10 μm, and a thickness of 140 μm, and has an asymmetric pore size distribution.

The hydroxyalkyl cellulose was caused to permeate the porous membrane by the procedure described Table 1. The procedure described in Table 1 is as follows. In addition, application was performed using a Gieser in all cases.

Immersion: The porous membrane was continuously immersed in a hydrophilizing liquid including two kinds of hydroxyalkyl celluloses continuously for 27 seconds and then was pulled up.

Double-sided application (large for large, small for small): A hydrophilizing liquid including a hydroxyalkyl cellulose having a larger weight-average molecular weight was applied on the side of a surface with a larger average pore size of the porous membrane, and a hydrophilizing liquid including a hydroxyalkyl cellulose having a smaller weight-average molecular weight was applied on the side of a surface with a smaller average pore size.

Double-sided application (small for large, large for small): A hydrophilizing liquid including a hydroxyalkyl cellulose having a smaller weight-average molecular weight was applied on the side of a surface having a larger average pore size of the porous membrane, and a hydrophilizing liquid including a hydroxyalkyl cellulose having a larger weight-average molecular weight was applied on the side of a surface having a smaller average pore size.

Sequential application (small then large): A hydrophilizing liquid including a hydroxyalkyl cellulose having a smaller weight-average molecular weight was applied on the side of a surface with a larger average pore size of the porous membrane, and then a hydrophilizing liquid including a hydroxyalkyl cellulose having a larger weight-average molecular weight was applied on the same surface side.

Sequential application (large then small): A hydrophilizing liquid including a hydroxyalkyl cellulose having a larger weight-average molecular weight was applied on the side of a surface with a larger average pore size of the porous membrane, and then a hydrophilizing liquid including a hydroxyalkyl cellulose having a smaller weight-average molecular weight was applied on the same surface side.

After the above-described procedure, each of the hydrophilic porous membranes was heated and dried in an oven at 80° C. for 80 seconds.

Each of the dried hydrophilic porous membranes was washed by immersing it in pure water at 25° C. for 5 minutes in order to remove any excess hydroxyalkyl cellulose. Subsequently, the hydrophilic porous membrane was dried for 24 hours in a temperature environment of 70° C.

[Evaluation of Weight-Average Molecular Weight]

Each of the hydrophilic porous membranes was cut out into a size of 10 cm×10 cm, and this was dissolved in N,N-dimethylformamide (DMF). After freeze-drying the dissolved solution, the dried product was dissolved in the following eluent, and an evaluation of the weight-average molecular weight of the hydroxyalkyl cellulose in the membrane was carried out.

The weight-average molecular weight was evaluated by gel permeation chromatography (GPC). The conditions are as follows.
Pullulan (P-82) was used as a molecular weight marker
Apparatus: HLC-8320GPC EcoSEC (Tosoh Corporation)
Column: OHpak KB-805 HQ (7.8 mm I.D.×30 cm)
Column: OHpak KB-804 HQ (7.8 mm I.D.×30 cm)
Column: OHpak SB-803 HQ (7.8 mm I.D.×30 cm)
Eluent: 0.1 M NaNO$_3$
Column temperature: 40° C.

The number of observed peaks and the weight-average molecular weights ($Mw_{max}$, $Mw_{min}$) of the peak observed earliest and the peak observed latest are presented in Table 1.

[Amount of Hydroxyalkyl Cellulose in Porous Membrane]

Five sheets each measuring 1 cm on each of four sides were cut out from a porous membrane, the mass was measured, and then the five sheets were immersed in 1 ml of methanol for 30 minutes. This liquid was evaluated using Liquid Chromatograph/Charged Aerosol Detector (LC/CAD). The conditions are as follows.
Standards: Solutions obtained by dissolving predetermined amounts of a hydroxyalkyl cellulose in methanol (20/50/100 ppm)
Apparatus: ACQUITY UPLC H-Class manufactured by Waters Corporation
Column: Presto FF-C1815084.6 mm
Detector: CAD (Corona Ultra RS manufactured by Thermo Fisher Scientific, Inc.)
Eluent: Liquid A . . . water, liquid B . . . Acetonitrile
Elution conditions: 5% to 90% B (0 to 15 min), 0.4 ml/min, 37° C.

The amount of the hydroxyalkyl cellulose in the porous membrane [HAC content in membrane (% by mass)] was calculated using the area ratio of the hydroxyalkyl cellulose peaks detected in the retention time of 8.5 to 12.5 minutes at the time of making measurement under the above-described conditions, to the peaks obtained with the standards.

[Distribution of Hydroxyalkyl Cellulose]

Two sheets each having a size of 20 cm×20 cm were cut out from each of the hydrophilic porous membranes. These were scraped respectively from the side of the surface with a larger average pore size and the side of the surface with a smaller average pore size of the porous membrane to the center in the thickness direction, chips thus obtained were respectively dissolved in DMF, and an evaluation of the weight-average molecular weight of the eluted hydroxyalkyl cellulose was carried out. The part on the side where the detection intensity of the peak with the latest detection time was larger (part A: the side of a surface with a smaller average pore size; part B: the side of a surface with a larger average pore size) was checked. A case where the values were all the same was designated as "Equal" in Table 1.

[Integrity Test]

A filtration filter cartridge (10 inches) was produced with a hydrophilized membrane, water was passed through the membrane at a rate of 8 L/min for 200 s, and then water was drained. Subsequently, an air pressure of 150 kPa was applied through a primary surface side, the amount of air that has come passing through the filtration filter cartridge was measured, and a case where the amount was 30 mL/min or less was considered acceptable, while a case where the amount was larger than this was considered unacceptable.

[Water Permeability]

The water permeability was evaluated with the water permeability at the time of causing pure water to permeate a hydrophilized porous membrane by applying a pressure of 100 kPa thereto. The volume of water that had flowed out through the membrane in 1 minute per unit area was measured, and this was designated as water permeability (mL/cm$^2$/min).

TABLE 1

| | Number of GPC peaks of HAC | Weight-average molecular weight | | Distribution of low molecular weight HAC | Average pore size of denseregion of porous membrane [μm] | $d_{max}$ [μm] | $Mw_{max}$/dmax |
| | | Earliest peak $Mw_{max}$ | Latest peak $Mw_{min}$ | | | | |
|---|---|---|---|---|---|---|---|
| Comparative Example 1 | 2 | 700,000 | 10,0000 | Equal | 0.20 | 10.0 | 100000 |
| Comparative Example 2 | 1 | 700,000 | — | Equal | 0.20 | 7.0 | 100000 |
| Example 1 | 2 | 700000 | 40000 | Equal | 0.20 | 7.0 | 100000 |
| Example 2 | 2 | 700000 | 40000 | Part A | 0.20 | 7.0 | 100000 |
| Example 3 | 2 | 700000 | 40000 | Part B | 0.20 | 7.0 | 100000 |
| Example 4 | 2 | 700000 | 40000 | Part A | 0.20 | 7.0 | 100000 |

TABLE 1-continued

| | | | | | | | | |
|---|---|---|---|---|---|---|---|---|
| Example 5 | 2 | 700000 | 40000 | Part B | 0.20 | 7.0 | 100000 |
| Example 6 | 2 | 700000 | 40000 | Part A | 2.00 | 20.0 | 35000 |
| Example 7 | 2 | 1000000 | 40000 | Part A | 0.20 | 7.0 | 143000 |
| Example 8 | 2 | 720000 | 90000 | Part A | 0.20 | 7.0 | 100000 |
| Example 9 | 2 | 700000 | 40000 | Part A | 0.20 | 7.0 | 100000 |
| Example 10 | 2 | 700000 | 40000 | Part A | 0.20 | 7.0 | 100000 |

| | Material of porous membrane | Type of HAC | HAC content in membrane (mass %) | HAC permeation method | Coating liquid concentration (mass %) | Integrity test (ml/min) | Water permeability (ml/min/cm$^2$) |
|---|---|---|---|---|---|---|---|
| Comparative Example 1 | PES | HPC | 1.5 | Immersion | 0.5 | 40 | 15 |
| Comparative Example 2 | PSF | HPC | 0.45 | Immersion | 0.125 | >1500 | 38 |
| Example 1 | PSF | HPC | 0.45 | Immersion | 0.125 | 25 | 41 |
| Example 2 | PSF | HPC | 0.45 | Double-sided application Large for large, small for small | 0.125 | 13 | 51 |
| Example 3 | PSF | HPC | 0.45 | Double-sided application Small for large, large for small | 0.125 | 25 | 40 |
| Example 4 | PSF | HPC | 0.45 | Sequential application Small then large | 0.125 | 14 | 52 |
| Example 5 | PSF | HPC | 0.45 | Sequential application Large then small | 0.125 | 26 | 40 |
| Example 6 | PSF2 | HPC | 0.45 | Double-sided application Large for large, small for small | 0.125 | 30 | 250 |
| Example 7 | PSF | HPC | 0.45 | Double-sided application Large for large, small for small | 0.125 | 30 | 43 |
| Example 8 | PSF | HEC | 0.45 | Double-sided application Large for large, small for small | 0.125 | 25 | 42 |
| Example 9 | PSF | HPC | 3.5 | Double-sided application Large for large, small for small | 2.0 | 5 | 40 |
| Example 10 | PSF | HPC | 0.01 | Double-sided application Large for large, small for small | 0.006 | 30 | 50 |

In Table 1, HAC represents hydroxyalkyl cellulose, HPC represents hydroxypropyl cellulose, and HEC represents hydroxyethyl cellulose.

What is claimed is:

1. A hydrophilic porous membrane comprising:
a porous membrane; and
a hydroxyalkyl cellulose retained in the porous membrane,
wherein an average pore size differs between two surfaces of the porous membrane,
the hydroxyalkyl cellulose distributed in a thickness direction of the hydrophilic porous membrane exhibits two or more peaks of detection intensity in gel permeation chromatography, and
a weight-average molecular weight Mw$_{min}$ of a peak that is detected latest among the peaks is less than 100,000.

2. The hydrophilic porous membrane according to claim 1,
wherein in a case where the hydrophilic porous membrane is divided in the thickness direction into two parts having an equal thickness, namely, part A and part B, from a side of a surface with a smaller average pore size,
the detection intensity of the peak that is detected latest in the gel permeation chromatography of the hydroxyalkyl cellulose retained in the part A is higher than that of the hydroxyalkyl cellulose retained in the part B.

3. The hydrophilic porous membrane according to claim 2,
wherein the hydrophilic porous membrane has a layered dense region with a minimum pore size in an inner part, a pore size continuously increases in the thickness direction from the dense region toward at least one membrane surface of the porous membrane, and
the dense region is located in the part A.

4. The hydrophilic porous membrane according to claim 3, wherein an average pore size of the dense region is 0.01 to 5 μm.

5. The hydrophilic porous membrane according to claim 1, wherein a weight-average molecular weight Mw$_{max}$ of a peak that is detected earliest among the peaks satisfies the following relationship:

$$30,000 \leq Mw_{max}/d_{max} \leq 130,000$$

in the formula, d$_{max}$ represents an average pore size [μm] at a surface on a side where the average pore size of the porous membrane is larger.

6. The hydrophilic porous membrane according to claim 1, wherein the porous membrane contains polyethersulfone or polysulfone.

7. The hydrophilic porous membrane according to claim 2, wherein the porous membrane contains polyethersulfone or polysulfone.

8. The hydrophilic porous membrane according to claim 3, wherein the porous membrane contains polyethersulfone or polysulfone.

9. The hydrophilic porous membrane according to claim 4, wherein the porous membrane contains polyethersulfone or polysulfone.

10. The hydrophilic porous membrane according to claim 1, wherein the hydroxyalkyl cellulose is hydroxypropyl cellulose.

11. The hydrophilic porous membrane according to claim 6, wherein the hydroxyalkyl cellulose is hydroxypropyl cellulose.

12. The hydrophilic porous membrane according to claim 1, wherein a total mass of the hydroxyalkyl cellulose is 0.02% to 3% by mass with respect to a total mass of the porous membrane.

* * * * *